Patented July 25, 1950

2,516,216

UNITED STATES PATENT OFFICE 2,516,216

THROMBOPLASTIN AS TESTING AGENT

Louis A. Kazal, Upper Darby, Pa., assignor to Sharp & Dohme, Incorporated, Philadelphia, Pa., a corporation of Maryland No Drawing. Application June 24, 1947, Serial No. 756,811

1 Claim. (Cl. 260—112)

This invention concerns thromboplastin compositions in which the thromboplastin is stable in the presence of air and without refrigeration over an extended period, and includes such compositions which remain stable in the dry state in the presence of air and without refrigeration for even periods of months, as well as such compositions in the form of aqueous suspensions that are stable in the presence of air and without refrigeration for a week or two or more.

It is well known that thromboplastin is exceedingly unstable under ordinary clinical laboratory atmospheric conditions and that extraordinary steps are required to maintain its stability. This is a distressing disadvantage, especially in those clinical laboratories where the large number and frequency of prothrombin determinations (as an indication of blood clotting effectiveness) requires a readily available adequate supply of stable and standard thromboplastin. It is hardly convenient to attempt to keep up such a supply by continuously freshly preparing the thromboplastin from the usual brain and lung tissue source materials having it.

I have found that thromboplastin can be stabilized to maintain its activity and potency in the presence of air and without refrigeration by adding to the usual thromboplastin-containing materials an agent which is a polyhydroxy benzene soluble in water and in solvents which do not inactivate or deleteriously affect the thromboplastin, such as acetone and dioxane, and which has at least one pair of hydroxyl groups in either ortho- or para-position to one another, such as a dihydroxy benzene as a catechol or hydroquinone, or a compound containing one or more residues obtained by removing a hydrogen from a nuclear carbon of catechol or hydroquinone, for example, 4,4'-(2,3-dimethyl-tetramethylene)-dipyrocatechol, or a trihydroxy benzene such as pyrogallol, or derivatives of these with substituents, such as alkyl or lower alkyl, or other radicals, on any other nuclear carbons. Such thromboplastin compositions, herein referred to as dry-stabilized thromboplastin compositions, have maintained the thromboplastin activity and potency for extensive periods of months, even as long as nine or ten months in the presence of air and without refrigeration and have allowed for the intermediate removal from time to time of such quantities of the composition required to make prothrombin determinations as needed.

Since thromboplastin is used in aqueous suspension in making prothrombin determinations, another feature of this invention embodies a modification of the compositions, according to which modification there is added to the dry-stabilized thromboplastin compositions, either at the time of their initial preparation or after they have been kept over a period of time and are to be converted to an aqueous thromboplastin suspension, a second agent which for convenience is referred to herein as a thromboplastin-aqueous-suspension-stabilizing agent. Such second agent is water soluble and does not inactivate or deleteriously affect the thromboplastin after being added to it, and does not denature or precipitate proteins in the concentrations of its use herein, and is, for example, a phenol, preferably an unsubstituted monohydric phenol, as phenol itself, or an aromatic compound containing mercury either directly bound to a nuclear carbon atom, such as a phenylmercuric salt as phenylmercuric nitrate, borate, acetate, or a halide as phenyl mercuric chloride, or with the mercury separated from the aromatic nucleus by intermediate linkage to a non-metal element as sulfur, as in sodium ethyl-mercurithiosalicylate. These agents serve to exemplify individually my discovery that aqueous thromboplastin suspensions are stabilized by incorporating in them a water-soluble, organic antibacterial agent that does not inactivate or deleteriously affect the thromboplastin. It is also possible to take the dry composition which originally contained 4,4'-(2,3-dimethyl-tetramethylene)-dipyrocatechol (also known as nordihydroguiaretic acid) and then extract it with saline, as is customary with the ordinary dry thromboplastin material to obtain an aqueous suspension of thromboplastin and to add to such suspension nordihydroguiaretic acid and thereby have a thromboplastin aqueous suspension stable withour refrigeration and in the presence of air for one or more weeks.

The compositions of the invention are prepared by starting with any of the thromboplastin materials obtained by known procedures from any of the source organs, as rabbit or horse brain, rabbit or beef lung, and the like, any of which is initially subjected in the usual manner to acetone desiccation, or by starting with the acetone treated source material while still wet with acetone.

The invention may be illustrated by, but not restricted to, the following examples:

*Example 1—Nordihydroguiaretic acid-thromboplastin dry composition.*—0.33 gram of nordihydroguiaretic acid was dissolved in 25 cc. of anhydrous acetone and the solution was then added to 10 grams of ordinary acetone-dried (horse brain) thromboplastin substance and the mixture ground thoroughly in a mortar. The thick, ground mixture was then thinned by the addition of an additional 25 cc. of anhydrous acetone and the thinned mixture transferred to a round-bottom flask. The flask was then connected with a condenser and the acetone was distilled off under vacuum, with heat applied to the flask by water-bath only for a short time at the end to drive off the last traces of acetone. The flask and its contents of the substantially dried residue was then placed in a vacuum oven over night. The resulting nordihydroguiaretic acid-thromboplastin dry composition, when last tested, was still stable and had maintained its original potency for over nine and one-half months without refrigeration and in the presence of air. The concentration of nordihydroguiaretic acid in this dry composition is 3.22 per cent.

*Example 2—Hydroquinone-thromboplastin dry composition.*—By replacing the nordihydroguiaretic acid in Example 1 and using instead 1.66 grams of hydroquinone and repeating the same procedure, there was obtained the hydroquinone-thromboplastin dry composition which, when last tested, was still stable and had maintained its original potency for over nine and one-half months without refrigeration and in the presence of air. The hydroquinone in this dry composition was 14.25 per cent.

By replacing the 1.66 grams of hydroquinone in this example by an equivalent quantity (about 1.9 grams) of pyrogallol and following the same procedure of this example, there is obtained a corresponding pyrogallol - thromboplastin dry composition.

Any quantity or all of any of the three compositions described in the preceding examples can be taken up in saline solution in the usual way and the extract separated from the tissue residue by certrifugation to yield an extract thromboplastin suspension which without further treatment, in the case of the composition from Example 1, remains stable in the presence of air and without refrigeration for a couple of days and, in the case of the compositions of Example 2, for at least a week or more. The stability of the just described nordihydroguiaretic acid-thromboplastin aqueous suspension can be extended to a couple or several weeks by adding to the aqueous suspension, preferably soon after its preparation, approximately one-tenth per cent of nordihydroguiaretic acid, either as a solid or dissolved in water, or to the same newly prepared nordihydroguiaretic acid-thromboplastic aqueous suspension, adding sufficient sodium ethylmercurithiosalicylate to give a final concentration of it from as little as 0.01 per cent up to 0.1 per cent, and the maintenance of the stability of the aqueous suspension is extended for at least another week or more. Any other thromboplastin-aqueous-suspension-stabilizing agent, as phenol or a phenylmercuric salt as phenylmercuric nitrate or halide such as chloride, may be used similarly to extend the stability and maintain potency of this aqueous suspension without refrigeration and in the presence of air.

Instead of adding the second agent, that is the thromboplastin - aqueous - suspension - stabilizing agent, after preparing the thromboplastin aqueous suspension from stabilized dry composition such as any of those of Examples 1 and 2, the invention embraces also the incorporation of the second agent as part of the preparation of the original dry composition. This phase of the invention is illustrated by, but not restricted to, the following embodiment:

*Example 3—Nordihydroguiaretic acid-sodium ethylmercurithiosalicylate - thromboplastin dry composition.*—200 grams of horse brain thromboplastin substance were added to 3 liters of anhydrous acetone in which there had been dissolved 6.66 grams of nordihydroguiaretic acid and 6.66 grams of sodium ethylmercurithiosalicylate. The mixture was then stirred for 15 minutes and thereafter placed in a 5 liter flask and the acetone removed by vacuum distillation, with heat applied by water bath at the end to drive off the last of the acetone. The thus dried composition was placed over night in a vacuum oven, in the presence of phosphorous pentoxide. The thus finally dried product is the dry composition of the example, and it remained stable and had maintained its potency for at least nine months. The nordihydroguiaretic acid in the dry composition was 3.12 per cent and the sodium ethylmercurithiosalicylate was 3.12 per cent.

The nordihydroguiaretic acid of Example 3 can be replaced by the equivalent quantity of hydroquinone or pyrogallol, for example, in the relationship indicated by their respective weights in Examples 1 and 2. Likewise, the sodium ethylmercurithiosalicylate of Example 3 or any of its modifications, in which the nordihydroguiaretic acid was replaced by hydroquinone or pyrogallol, can be replaced in such quantity that the aqueous suspension prepared from it shows a phenol content between 0.25 and 0.5 per cent.

While horse brain was used as the thromboplastin source material in the preceding various examples, corresponding compositions are obtained by starting with rabbit brain thromboplastin source material in the same quantities respectively as in the three examples.

While the preceding examples illustrate dry compositions prepared by adding the indicated types of thromboplastin stabilizing agents for them, the invention, as it relates to thromboplastin aqueous suspensions, also include the stabilization of aqueous suspensions of thromboplastin prepared from non-stabilized thromboplastin powder, by preparing an aqueous suspension from such non-stabilized thromboplastin powder in the usual manner and adding thereto an antibacterial agent of the type described and exemplified in the first complete paragraph of page 2 above and which, for stabilization of aqueous suspensions from non-stabilized thromboplastin powder, also includes any of the agents described in the last paragraph of page 1 above.

Accordingly, the invention, insofar as it relates to the stabilization of aqueous suspensions freshly prepared from non-stabilized thromboplastin powder, is illustrated by, but not restricted to, the following aqueous preparations, stable in the presence of air and without refrigeration:

*Example 4 — Hydroquinone - thromboplastin aqueous suspension.*—2.4 grams of rabbit brain thromboplastin powder, obtained in known manner, were extracted with 40 cc. of physiological saline solution at 50° C. for 15 minutes and the mixture was then centrifuged for half a minute at 2000 R. P. M. The supernatant liquid was decanted and diluted with an equal volume of one per cent aqueous solution of hydroquinone, thereby producing the stable suspension which maintained its stability and potency for at least 28 days, while in the liquid state at room temperature and in the presence of air.

*Example 5—Phenylmercuric nitrate-thromboplastin suspension.*—The same amount of rabbit brain thromboplastin powder was extracted and centrifuged in the same manner as in Example 4 and the resulting supernatant was decanted and diluted with an equal volume of 0.02 per cent aqueous solution of phenylmercuric nitrate, thereby producing the stable suspension which maintained its stability and potency for at least 16 days, while in the liquid state at room temperature and in the presence of air.

*Example 6—Nordihydroguiaretic acid-thromboplastin suspension.*—The same amount of rabbit brain thromboplastin powder was extracted and centrifuged in the same manner as in Example 4 and the resulting supernatant was decanted and diluted with an equal volume of 0.2 per cent aqueous solution of nordihydroguiaretic acid, thereby producing the stable suspension which maintained its stability and potency for at least 21 days, while in the liquid state at room temperature and in the presence of air.

While the invention has been illustrated with respect to certain specific embodiments of it, it is understood that it is not limited to them and that suitable modifications and substitutions may be made within the scope of the appended claim.

What is claimed is:

A dry thromboplastin preparation, stable in the presence of air and without refrigeration for a longer period than ordinary thromboplastin preparations which do not contain a stabilizing agent, which preparation comprises nordihydroguaiaretic acid in sufficient quantity, on the order of 3%, to stabilize the thromboplastin in the presence of air and without refrigeration of the preparation.

LOUIS A. KAZAL.

REFERENCES CITED

The following references are of record in the file of this patent:

UNITED STATES PATENTS

| Number | Name | Date |
| --- | --- | --- |
| 2,162,863 | Ripke et al. | June 20, 1939 |
| 2,372,192 | Lauer | Apr. 10, 1945 |
| 2,385,803 | Cohn | Oct. 2, 1945 |
| 2,398,077 | Smith | Apr. 9, 1946 |

FOREIGN PATENTS

| Number | Country | Date |
| --- | --- | --- |
| 545,781 | Great Britain | Mar. 5, 1932 |

OTHER REFERENCES

Gutman, Modern Drug Encyclopedia and Therapeutic Index, 3rd edition, N. Y., Yorke Publishing Co. (received July 22, 1946), pages 459, 752.

Physician's Bulletin, March–April 1942, pages 39, 40, 41.

Edsall et al., J. Clin. Invest., July 1944, pages 557–565 (page 562 specifically relied upon).

Poncher et al., J. of Laboratory and Clinical Medicine, pages 385–391, volume 27, Dec. 1941.

Quick, American J. Physiol. 114 (1936), pages 282–296.

Quick, The Hemorrhagic Diseases (1942), pages 64–72.

Certificate of Correction

Patent No. 2,516,216                                                             July 25, 1950

LOUIS A. KAZAL

It is hereby certified that error appears in the printed specification of the above numbered patent requiring correction as follows:

Column 2, line 39, for "withour" read *without*; column 4, lines 52 and 53, strike out the words "first complete paragraph of page 2 above" and insert instead *complete paragraph beginning column 1, line 54*; line 56, strike out "last paragraph of page 1 above" and insert instead *complete paragraph beginning column 1, line 25*; and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*